Aug. 31, 1965
A. W. SERIO
3,203,029
DETACHABLE HANDLE APPARATUS
Filed June 21, 1963
2 Sheets-Sheet 1
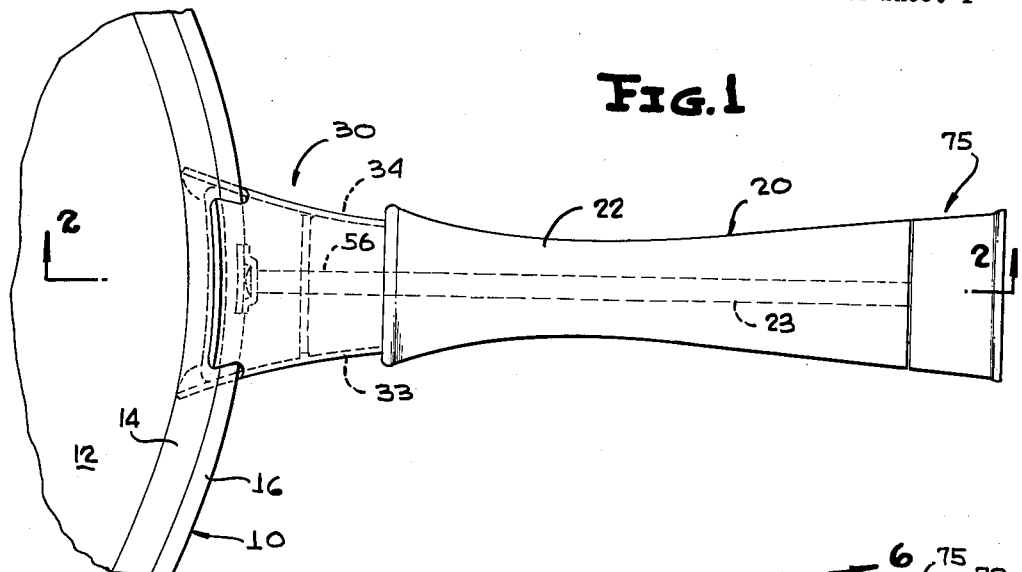
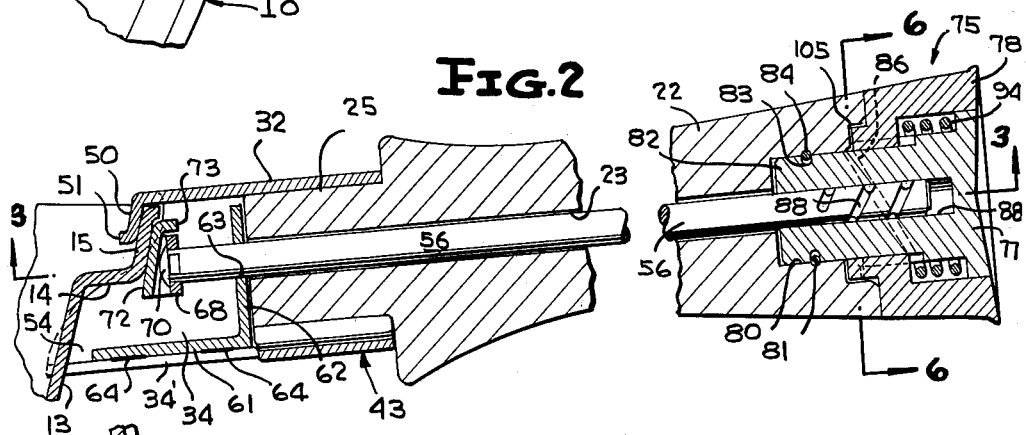
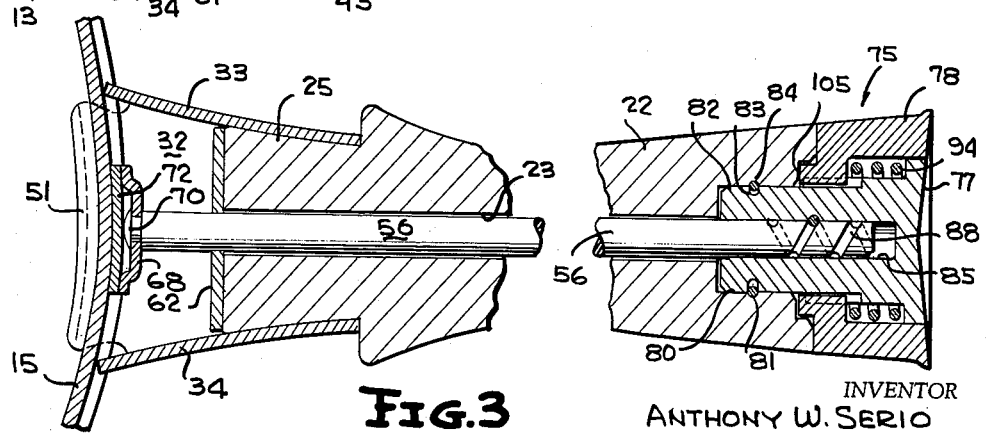
INVENTOR
ANTHONY W. SERIO
BY *Shoemaker and Mattare*
ATTORNEYS

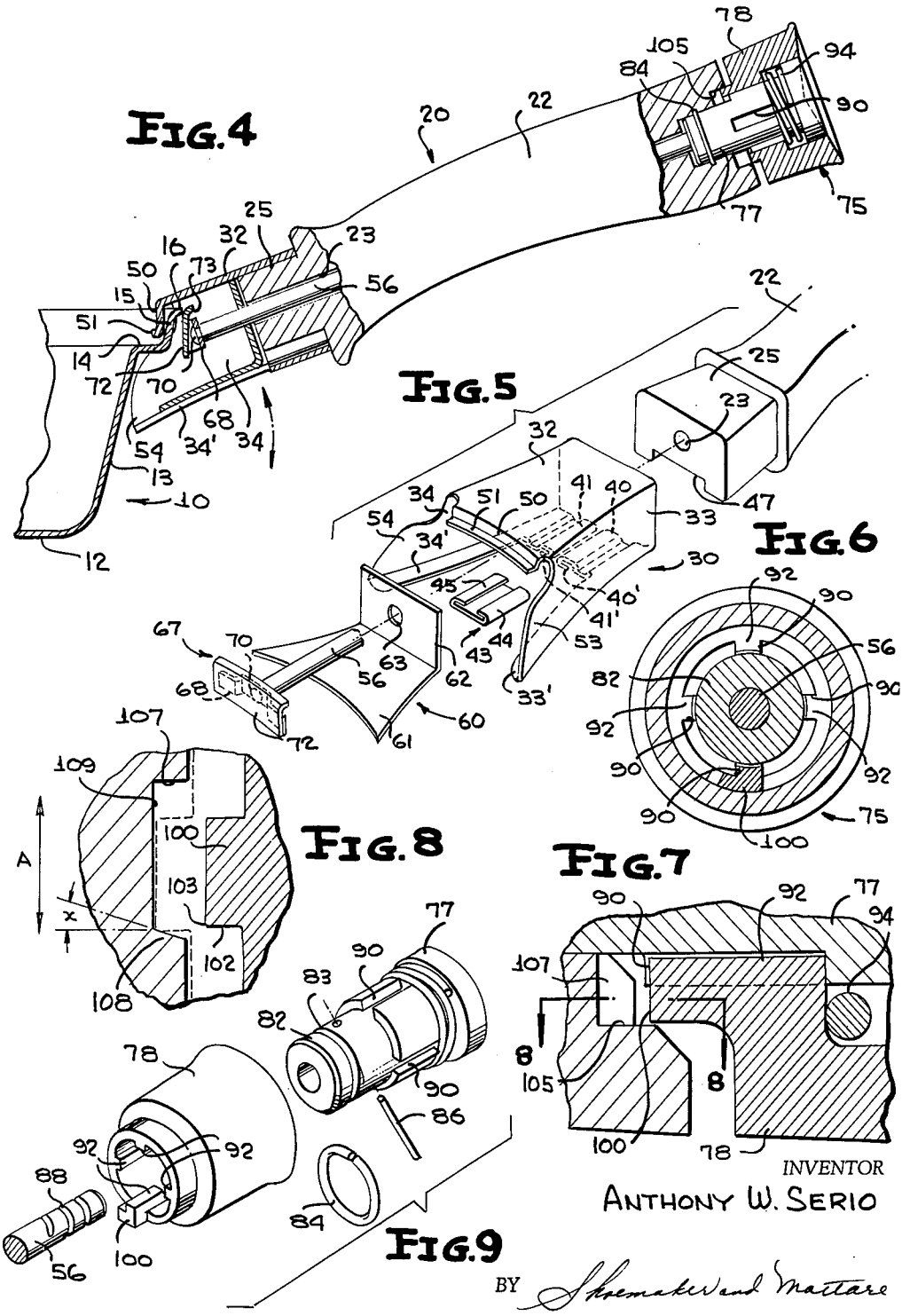

United States Patent Office 3,203,029
Patented Aug. 31, 1965

3,203,029
DETACHABLE HANDLE APPARATUS
Anthony W. Serio, Hillcrest Road, Elmira, N.Y.
Filed June 21, 1963, Ser. No. 289,700
13 Claims. (Cl. 16 —114)

The present invention relates to a novel detachable handle apparatus, and more particularly to handle apparatus which may be quickly and easily attached to and detached from containers such as saucepans, fry pans and the like.

Saucepans and fry pans as utilized in cooking operations often become very hot, and accordingly it is desirable to provide means for lifting these pans from time to time without the necessity of handling the pan either with the hands or by the use of bulky heat-insulating pads and the like. It is accordingly desirable to provide handle apparatus which can be quickly attached and removed from the pans as desired, the handle apparatus including a hand grip portion formed of heat-insulating material which thereby enables a person to readily handle the pans regardless of how hot they may be.

A particular feature of the present invention is the fact that the detachable handle apparatus is readily usable with sauce and fry pans of conventional construction which may be formed of metal or other similar material and which generally include a relatively thin side wall portion which may or may not have a lip formed at the upper end thereof. Prior art detachable handle apparatus similar to that of the present invention have employed arangements which often require special laterally extending portions on the associated containers for connecting the handle apparatus to the containers. No such additional special means need be provided with the present invention; and, accordingly, the handle apparatus is afforded maximum versatility with conventional sauce and fry pan constructions without requiring any modification thereof.

It is additionally important to provide handle apparatus which is relatively light in weight and presents a neat and attractive appearance when mounted in operative position on an associated container, and which further can be quickly and easily manipulated simply by turning a suitable actuating means mounted at the outer end of the handle, this operation requiring a minimum amount of exertion and manual dexterity. In the present invention, the actuating means need merely be turned at the outer end of the handle apparatus, and the clamping mechanism at the opposite end of the handle apparatus is moved into firm and positive clamping relationship with a side wall portion of an associated container, clamping the container in such relationship that it cannot possibly be accidentally detached from the handle apparatus.

In addition, it is important to provide a means for insuring that the actuating means cannot be accidentally manipulated so as to release the clamping mechanism when material is in the container or while lifting and carrying the container from place to place. In order to accomplish this function, the present invention incorporates a locking mechanism which automatically locks the device when the clamping mechanism has been moved into its operative position, and which is held in such automatic clamping relationship until it is desired to release the handle apparatus from an associated container. Normal turning or twisting action of the handle apparatus which may occur in lifting or carrying the container cannot accidentally release the clamping mechanism since when the actuating means is in its operative locked relationship, it is necessary to first move a portion of the actuating means longitudinally with respect to the handle apparatus and then it is necssary to rotate the actuating means in order to fully release the clamping means. This is important since it is possible that under certain conditions the weight of the container and the material therein may tend to cause the handle apparatus including the hand grip portion thereof to rotate, and if relative longitudinal movement were not required first in order to release the actuating means, it is possible that the hand grip portion might accidentally rotate with respect to the actuating means causing inadvertent release of the clamping mechanism.

The positive locking means of the present invention additionally incorporates a novel arrangement which facilitates movement of one of the locking portions into engagement with the other locking portion. In the invention device, a locking lug is mounted on a first member and a locking recess is formed in a second member, this lug being received in the recess when the device is in operative clamped and locked relationship. One of the walls of the recess is provided with an angular relationship to the locking portion of the lug such that the lug is adapted to slide more easily into its operative relationship within the recess thereby facilitating movement of the clamping means into its operative clamped relationship and locking of the actuating means in this position. The slope or angularity of the wall of the recess is of a certain predetermined limit such that it will not result in accidental or premature release of the lug from the recess while at the same time facilitating entry therein.

An object of the present invention is to provide new and novel detachable handle apparatus which is particularly adapted for use with saucepans, fry pans and the like.

Another object of the invention is the provision of detachable handle apparatus which is readily usable with pans of conventional construction and which requires no additional or special components for attachment of the handle mechanism.

A further object of the invention is to provide detachable handle apparatus which provides an attractive and neat appearance when mounted in operative position, and which can be quickly and easily attached to or removed from an associated container by manipulating a rotatable knob portion at the outer end of the apparatus.

Still another object of the invention is the provision of detachable handle apparatus which provides an effective and positive clamping action with an associated container and which further includes a safety feature in the form of a positive locking means for preventing inadvertent release of the actuating mechanism of the apparatus.

A still further object of the invention is to provide detachable handle apparatus including positive locking means incorporating means for facilitating movement of the cooperating locking portions into operative relationship relative to one another.

A still further object of the invention is the provision of detachable handle apparatus which is quite simple, compact and inexpensive in construction, and yet which is quite sturdy and reliable in operation.

Other objects and many attendant advantages of the invention will become more apparent when considered in connection with the specification and accompanying drawings, wherein:

FIG. 1 is a top view illustrating the handle apparatus of the present invention in operative relationship upon an associated container;

FIG. 2 is a sectional view, partly broken away, taken substantially along line 2—2 of FIG. 1 looking in the direction of the arrows;

FIG. 3 is a sectional view, partly broken away, taken substantially along line 3—3 of FIG. 2 looking in the direction of the arrows;

FIG. 4 is a view illustrating the detachable handle apparatus partly broken away and showing it being moved either into or out of operative relationship with respect to the upper portion of a container;

FIG. 5 is a top perspective exploded view of one end potrion of the handle apparatus illustrating the assembly of the components;

FIG. 6 is a sectional view taken substantially along line 6—6 of FIG. 2 looking in the direction of the arrows;

FIG. 7 is an enlarged view of a portion of the actuating mechanism showing the actuating mechanism in its unlocked position as seen also in FIG. 4;

FIG. 8 is a sectional view taken substantially along line 8—8 of FIG. 7 looking in the direction of the arrows; and FIG. 9 is a top exploded perspective view illustrating the assembly of the components of the actuating means mounted at the outer end of the handle apparatus.

Referring now to the drawings wherein like reference characters designate corresponding parts throughout the several views, there is shown in FIGS. 1 and 4 a typical saucepan or fry pan container indicated generally by reference numeral 10 and including a bottom wall portion 12 which merges with an upwardly and outwardly extending side wall portion 13 which in turn joins with a radially outwardly extending annular portion 14 defining an upwardly facing shoulder adapted to receive a cover or the like, portion 14 in turn joining with an upwardly and outwardly extending rim portion 15 which in turn extends outwardly to form the uppermost outer edge portion 16 of the container.

The handle apparatus in the present invention is indicated generally by reference numeral 20 and includes a hand grip means or member 20 which is of elongated construction and substantially symmetrical about the longitudinal axis thereof, the hand grip member having a central bore 23 extending completely therethrough along the longitudinal axis thereof. The hand grip member also includes a reduced portion 25 formed at one end thereof for a purpose hereinafter described.

The aforementioned hand grip member is formed of a suitable heat insulating material such as plastic or the like while a body means indicated by reference numeral 30 may be formed of a suitable metallic substance which is relatively rigid. Body means 30 includes a top wall portion 32 having a pair of depending wall portions 33 and 34 formed along opposite side edges thereof. Walls 33 and 34 include inwardly extending flange portions 33' and 34' respectively. Also extending inwardly from flanges 33' and 34' are portions 40 and 41 which as seen particularly in FIG. 5 are bent longitudinally thereof for rigidity and have the outermost end portions 40' and 41' thereof respectively bent back parallel with the main portion thereof to define small longitudinally extending channels. A member 43 comprises a flat plate having the opposite end edges 44 and 45 thereof bent back parallel with the main portion thereof, portions 44 and 45 being respectively received within the channel portions 40' and 41' in the assembled position such that when the reduced end portion 25 of the hand grip member is received within wall portions 32, 33 and 34, the member 43 will serve to tightly clamp the wall portions about the reduced portion of the hand grip member to retain the assembly in operative position. Portions 40 and 41 which are bent upwardly out of the plane of the flange portions 33' and 34' as well as member 43 are received within a cutout portion 47 provided in the under surface of the reduced potrion 25 of the hand grip member.

The upper wall portion 32 also includes a depending clamping portion 50 which extends downwardly and forwardly of the upper wall portion and terminates in an outwardly extending portion 51. It will be noted that the inner surface of this clamping portion 50 is adapted to engage the inner surface of the portion 15 of the container and is adapted to be clamped tightly thereagainst.

The side wall portions 33 and 34 include forwardly extending portions 53 and 54 spaced to either side of the central depending clamping portion 50, it being noted that portions 53 and 54 taper downwardly to the flange portions 33' and 34' respectively, these portions 53 and 54 being adapted to engage the outer surface of the container for supporting the handle apparatus against the outer surface of the container at two spaced points therealong as it will be well understood. It will also be noted that the inner surface of the clamping portion 50 is substantially arcuate in configuration and generally will be made of a curvature so as to fit the largest diameter pan with which the device is to be used.

An elongated operating shaft 56 is disposed within the central bore formed through the hand grip member, there being sufficient clearance between the bore and the shaft to permit expansion and contraction movements of the hand grip member which may be formed of a material which may have a substantial amount of expansion and contraction with large temperature variations. In order to support the outer end of the shaft 56, a support plate 60 is provided, this plate as seen particularly in FIG. 5 including a pair of leg portions 61 and 62 which are disposed substantially normally to one another, portion 61 being of such shape as to fit snugly between the opposite side walls 33 and 34 of the body means while the upstanding leg portion 62 also fits snugly between the adjacent portions of the side walls and has a central opening 63 formed therethrough. Opening 63 is adapted to snugly receive the outer end of shaft 56 such that the shaft may readily slide therethrough and yet receive firm support therefrom. Support plate 60 may be suitably fixed in operative position within the body means as by spot welding the bottom portion thereof to the flange portions 33' and 34' as indicated, for example in FIG. 2 by reference numeral 64.

Clamping means indicated generally by reference numeral 67 is mounted at the outer end of shaft 56, the clamping means including an inner plate 68 which is secured to the end of the shaft by means of a rivet 70 or the like, an outer plate 72 being secured to the inner plate 68 as by spot welding and the like. Plate 72 is generally arcuate in cross-sectional configuration as seen particularly in FIG. 3 for example, and also includes a lip portion 73 at the upper edge thereof which is generally arcuate in shape and extends away from the main body portion of the outer plate. As seen in FIG. 2, it will be seen that when the clamping means is in its operative clamping position, the portion 15 of the container is tightly clamped between portions 50 and 72 of the handle apparatus and will be retained in this clamped relationship with the portions 53 and 54 of the body means in engagement with the outer surface of the container. Outer plate 72 is also provided with an arcuate configuration which is such as to substantially fit flush with the largest size pan with which the handle apparatus is to be ordinarily utilized.

Referring now particularly to FIG. 2 of the drawings, the actuating means of the present invention is indicated generally by reference numeral 75 and includes two portions 77 and 78 which are interconnected with one another in a manner hereinafter described. The hand grip member 22 is provided with a counterbored portion 80 which is substantially cylindrical in configuration and receives snugly the outer cylindrical surface of the portion 82 of the portion 77 of the actuating means. The counterbored portion 80 of the hand grip member is provided with an annular groove 81 in the inwardly facing surface thereof and outwardly facing surface of portion 82 is provided with an annularly extending groove 83 which is adapted to be aligned with groove 81 and to receive a resilient split ring 84 for removably retaining the actuating means in the operative position as shown.

Portion 77 is provided with a centrally extending bore 85 which receives the end portion of shaft 56, a pin member 86 being mounted within a suitable obliquely extending opening provided in member 77 and being in communication with the bore portion 85 and received within a thread 88 formed in the outer surface of shaft 56 such that rotation of portion 77 of the actuating means with respect to the shaft will cause reciprocatory movement of the shaft through the bore of the hand grip member.

Portion 78 of the actuating means is of generally annular configuration and is adapted to fit about portion 77. As seen particularly in FIGS. 6 and 9, portion 77 is provided with four substantially equally spaced longitudinally extending slots 90 which receive four substantially equally spaced radially inwardly extending ribs 92 formed on member 78, these ribs being slidably positioned within the grooves 90 such that portion 78 is slidably mounted with respect to portion 77 and yet is constrained against relative rotation with respect thereto.

As seen in FIG. 2, a resilient compression spring 94 is mounted within an annular space defined between members 77 and 78, this spring normally biasing portion 78 of the actuating means towards the hands grip member. This resilient means serves to normally bias the actuating portion toward the locking position wherein a portion of the actuating means is adapted to engage a portion of the hand grip member to positively lock the actuating means against relative rotation with respect to the hand grip member.

Referring now particularly to FIGS. 7 and 8 of the drawings, the portion 78 of the actuating means includes a longitudinally extending locking lug 100 which extends in a circumferential direction only a very minor portion of the circumferential extent of the actuating portion 78, the locking lug including a locking surface 102 which lies substantially in a plane which extends substantially parallel with the longitudinal axis of the hand grip member and spaced therewith.

A cooperating locking means is formed in the hand grip member, the hand grip member being provided with an annularly extending relieved portion 105 having formed therein a recess for receiving the locking lug, the recess as seen in FIG. 8 including opposite side wall portions 107 and 108 and a bottom wall 109. It will be noted that the circumferential extent of the recess defined in the hand grip member which would be measured in a direction indicated by the double-headed arrow A while being only a very minor portion of the circumferential extent of the relieved portion of the hand grip member, is at the same time substantially greater than the circumferential extent of the lug portion 100 for receiving the lug within the recess.

It will also be noted that the side wall portion 108 of the recess lies substantially in a plane, this locking surface or portion 108 not being exactly parallel with a plane passing through the longitudinal axis of the hand grip member, but defining an angle $x$ with the locking surface of portion 102 of the locking lug as seen in FIG. 8 when the locking lug is in its locked position, this angle being an acute angle and being not greater than approximately fifteen degrees. Another way of defining this angle is to say that it is the angle which the locking surface 108 of the recess forms with a plane extending through the junction of the locking surface 108 with the bottom wall 109 of the recess, the plane extending substantially parallel with the longitudinal axis of the handle apparatus.

As the actuating means is rotated into its operative locked position as illustrated by the dotted line position of the locking lug in FIG. 8, the locking lug will move into the position shown in dotted lines with the edge 103 of the locking lug sliding down along the inclining surface 108 to facilitate movement of the locking lug into the recess in the hand grip member. As the locking lug moves into this operative locked position, the clamping plate 72 at the other end of the shaft will be moved into its operative clamped relationship with respect to the locking portion 50 of the body means to tightly clamp the associated portion of a container therebetween.

While the angle $x$ of the wall portion 108 of the recess permits the locking lug to easily move into its operative locked position, this angle is not such that it will allow the locking lug to accidentally release, and in order to release the locking lug, it is necessary to pull outwardly on the portion 78 of the actuating means to move it longitudinally with respect to the portion 77, and then the portion 78 as well as the associated portion 77 may be turned so as to cause reciprocatory movement of the shaft 56 within the hand grip member. When moving the clamping means into its operative position, the actuating means is rotated, and it is apparent that the spring means 34 will urge the locking lug 100 into the recess formed in the hand grip member.

It is apparent from the foregoing that there is provided, according to the present invention, a detachable handle apparatus of a new and novel construction which is particularly adapted for use with saucepans, fry pans and the like and which can be utilized with conventional pan constructions without any modification or additions thereto. The handle apparatus when in operative position provides a neat and attractive appearance and can be quickly and easily attached or removed as desired by simple turning movement of the actuating means at the outer end thereof. The clamping means of the present invention is such as to provide a very effective clamping action with the side wall portion of a container, and means is provided for automatically locking the handle apparatus in its operative clamped relationship so that it is positively locked and cannot accidentally release while under load. The sloping surface of the recess receiving the locking lug provides a means for facilitating movement of the locking portions into their operative locked relationship, preventing in a positive manner release of the actuating means by rotation of the actuating means, and necessitating longitudinal as well as rotative movement of the actuating means in order to selectively release the clamping means. The handle apparatus of the present invention is quite simple, compact and inexpensive in construction, and yet is quite sturdy and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Detachable handle apparatus comprising a hand grip portion, clamping means adjacent one end of said hand grip portion and being movably supported by said hand grip portion for movement into and out of clamping position, actuating means mounted adjacent the opposite end of said hand grip portion, means interconnecting said actuating means with said clamping means whereby said clamping means may be operatively moved by said actuating means, said actuating means including a portion which is mounted for rotation with respect to said hand grip portion and which is also slidably mounted for movement longitudinally toward and away from said hand grip portion, and means on said actuating means and said hand grip portion for positively locking said actuating means against rotation with respect to said hand grip portion and being interengageable upon sliding movement of said actuating means portion toward said hand grip portion, said interengageable locking means also being selectively releasable.

2. Detachable handle apparatus comprising a hand grip portion, clamping means movably supported adjacent one end of said hand grip portion, a shaft extending longitudinally of said hand grip portion, actuating means movably supported at the opposite end of said hand grip portion and being operatively connected with said shaft, said shaft also being connected with said clamping means whereby movement of said actuating means serves to move said clamping means into clamping position, said actuating means including a portion which is both rotatable with respect to said hand grip portion and which is movable longitudinally toward and away from said hand grip portion, means normally resiliently biasing said portion of the actuating means longitudinally toward said hand grip portion, said hand grip portion including interengageable means for positively locking said portion of the actuating means against rotation with respect to the hand grip portion and permitting movement of said portion of the actuating means away from said hand grip portion to permit relative rotation between said portion of the actuating means and the hand grip portion.

3. Detachable handle apparatus comprising an elongated hand grip member, said hand grip member having a bore extending longitudinally therethrough, clamping means movably supported adjacent one end of said hand grip portion for movement into and out of clamping position, a shaft extending through the bore of said hand grip member and being operatively connected with said clamping means, actuating means supported adjacent the opposite end of said hand grip member and including a first portion operatively connected with said shaft and rotatable with respect to said hand grip member, said actuating means including a second portion fixed for rotation with said first portion and being movable longitudinally with respect thereto, said second portion of the actuating means and said hand grip member including interengageable means for positively locking the actuating means against rotation relative to said hand grip member, said second portion of the actuating means including a projection extending longitudinally of said portion of the actuating means, said hand grip member having a recess formed therein for receiving said projection, said projection and said recess including interengageable locking portions, said locking portions extending substantially parallel with the longitudinal axis of said hand grip member.

4. Apparatus as defined in claim 3 wherein said recess includes a locking portion in the form of a surface which extends at a slight angle to a plane extending parallel to and spaced from the longitudinal axis of said hand grip member.

5. Detachable handle apparatus comprising an elongated hand grip member which is substantially symmetrical about a longitudinal axis, body means supported at one end of said hand grip member and including a clamping portion, clamping means movably supported adjacent said one end of said hand grip member and including a clamping portion adapted to cooperate with said first clamping portion to clamp an object therebetween, said hand grip member having an elongated bore formed substantially along the longitudinal axis thereof, a shaft extending through said bore, one end of said shaft being operatively connected with said clamping means, actuating means operatively connected with the opposite end of said shaft and being supported adjacent the opposite end of said hand grip member, said actuating means including a portion which is mounted for relative rotation and relative longitudinal movement with respect to said hand grip member, said portion of the actuating means and said hand grip member including interengageable means for positively locking said portion of the actuating means against rotation relative to said hand grip member but permitting relative longitudinal movement therebetween, said portion of the actuating means including a longitudinally extending lug including a locking portion, said hand grip member including a recess for receiving said lug, said recess being of greater dimension than said lug, said recess having a locking portion adapted to cooperate with said first-mentioned locking portion for positively preventing rotation of said portion of the actuating means with respect to said hand grip member, said locking portions lying substantially in planes which extend substantially parallel with and spaced from a plane extending through the longitudinal axis of said hand grip member.

6. Apparatus as defined in claim 5 wherein the locking portion of said recess lies substantially in a plane, extending at a slight angle with respect to the plane of the locking portion of said actuating means when said actuating means is in operative locking relationship, said angle being no greater than approximately fifteen degrees.

7. Detachable handle apparatus comprising an elongated hand grip means having a bore formed therethrough substantially along the longitudinal axis thereof, body means supported at one end of said hand grip means and including a depending clamping portion, said body means also including portions spaced to either side of said depending clamping portion for engaging parts of a container, clamping means movably supported adjacent said one end of said hand grip means and including a portion movable into clamping relationship with respect to the clamping portion of said body means for clamping parts of the container therebetween, an elongated shaft extending through the bore in said hand grip means, said clamping means being connected to one end of said shaft, actuating means supported at the opposite end of said hand grip means, said actuating means including a first portion removably attached to said hand grip means and being operatively connected with the opposite end of said shaft for producing reciprocatory movement of said shaft upon rotation of said actuating means, said actuating means including a second portion, said second portion being fixed for rotation with said first portion and being movable relative to said first portion in a longitudinal direction, said second portion and said hand grip means including interengageable means for positively locking said second portion against rotation with respect to said hand grip means to thereby positively prevent release of said clamping means when in operative position.

8. Apparatus as defined in claim 7 wherein said second portion of said actuating means includes a longitudinally extending locking lug having a locking surface lying substantially in a plane, said hand grip means including a recess for receiving said lug, said recess having a greater circumferential dimension than said lug and including a locking surface lying substantially in a plane, said locking surfaces including interengageably portions for positively preventing relative rotation between said actuating means and said hand grip means when interengaged.

9. Apparatus as defined in claim 8 wherein the locking surface of said recess lies in a plane extending at an angle defining an angle with a plane extending parallel with said longitudinal axis of the hand grip means and passing through the point of intersection of said locking surface of the recess in the bottom of the recess, said angle being not more than approximately fifteen degrees to facilitate movement of the actuating means into its locked relationship with respect to said hand grip means.

10. Apparatus as defined in claim 7 including resilient means normally biasing said second portion of the actuating means towards said hand grip member.

11. Apparatus as defined in claim 7 wherein said interengageable means includes a longitudinally extending lug formed on the first portion of said actuating means and having a circumferential dimension with respect to said longitudinal axis, said hand grip means including a recess for receiving said lug and having a longitudinal dimension, longitudinal dimension of said recess being substantially greater than the longitudinal dimension of said lug, said lug and said recess including interengageable portions, said lug being formed on an annular portion of said second actuating means portion, the lugs extending in a circumferential direction only a very minor portion of the circumferential dimension of the said annular portion, said recess being formed in an annularly extending relieved portion of said hand grip means, said recess extending in a circumferential direction only a very minor portion of the circumferential dimension of said relieved portion.

12. Detachable handle apparatus comprising an elongated hand grip member shaped to accommodate the human hand, said hand grip member having an elongated bore formed therethrough, said hand grip member having a reduced portion at one end thereof, body means including a portion fitted around said reduced end portion, means for clamping said body means in operative position, said body means including an upper wall portion and a depending clamping portion extending downwardly from one end of said upper wall portion, said body means also including side portions formed on either side of said depending clamping portion and extending therebeyond for engaging the outer surface of a container, a support plate supported by said body means and having an opening formed therethrough, an elongated operating shaft extending through the bore in said hand grip member and being relatively snugly received within the opening in said support plate, clamping means supported at one end of said shaft, said clamping means being movable toward and away from the clamping portion of said body means for clamping a portion of the container therebetween, said clamping means including an arcuate plate member, said arcuate plate member being adapted to engage the outer surface of the container, actuating means supported at the opposite end of said hand grip member, said hand grip member having a counterbored portion, said actuating means including first and second portions, said first portion being received within said counterbored portion, means for retaining said first portion within said counterbored portion, means providing a threaded interconnection between said first portion and the opposite end of said shaft whereby rotation of said first portion with respect to said hand grip member causes reciprocation of said shaft, said second portion being mounted on said first portion for movement relative thereto in a longitudinal direction but being fixed to said first portion for rotation therewith, resilient means normally biasing said second portion toward said hand grip member, said second portion including a single locking lug extending longitudinally thereof toward said hand grip member, said hand grip member including a single recess formed therein for receiving said lug, said lug and said recess including interengageable portions for positively locking said actuating means against rotation with respect to said hand grip member.

13. Apparatus as defined in claim 12 wherein said locking lug includes a locking portion formed substantially in a plane and extending substantially parallel with a plane extending through the longitudinal axis of said hand grip member, said recess including a locking portion formed substantially in a plane, the plane of said last mentioned locking portion defining with a plane extending parallel with said longitudinal axis and passing through the intersection of said last mentioned locking portion of the bottom of said recess an acute angle of not more than approximately fifteen degrees for facilitating movement of said locking lug into locking position within said recess.

References Cited by the Examiner

UNITED STATES PATENTS

| | | | |
|---|---|---|---|
| 2,851,299 | 9/58 | Serio | 16—114 |
| 3,065,016 | 11/62 | Serio | 294—31 |
| 3,065,017 | 11/62 | Serio | 16—114 |

DONLEY J. STOCKING, *Primary Examiner.*